Nov. 28, 1939.     H. A. LOVEGRAN     2,181,141
CLOTHESLINE REEL
Original Filed April 6, 1931
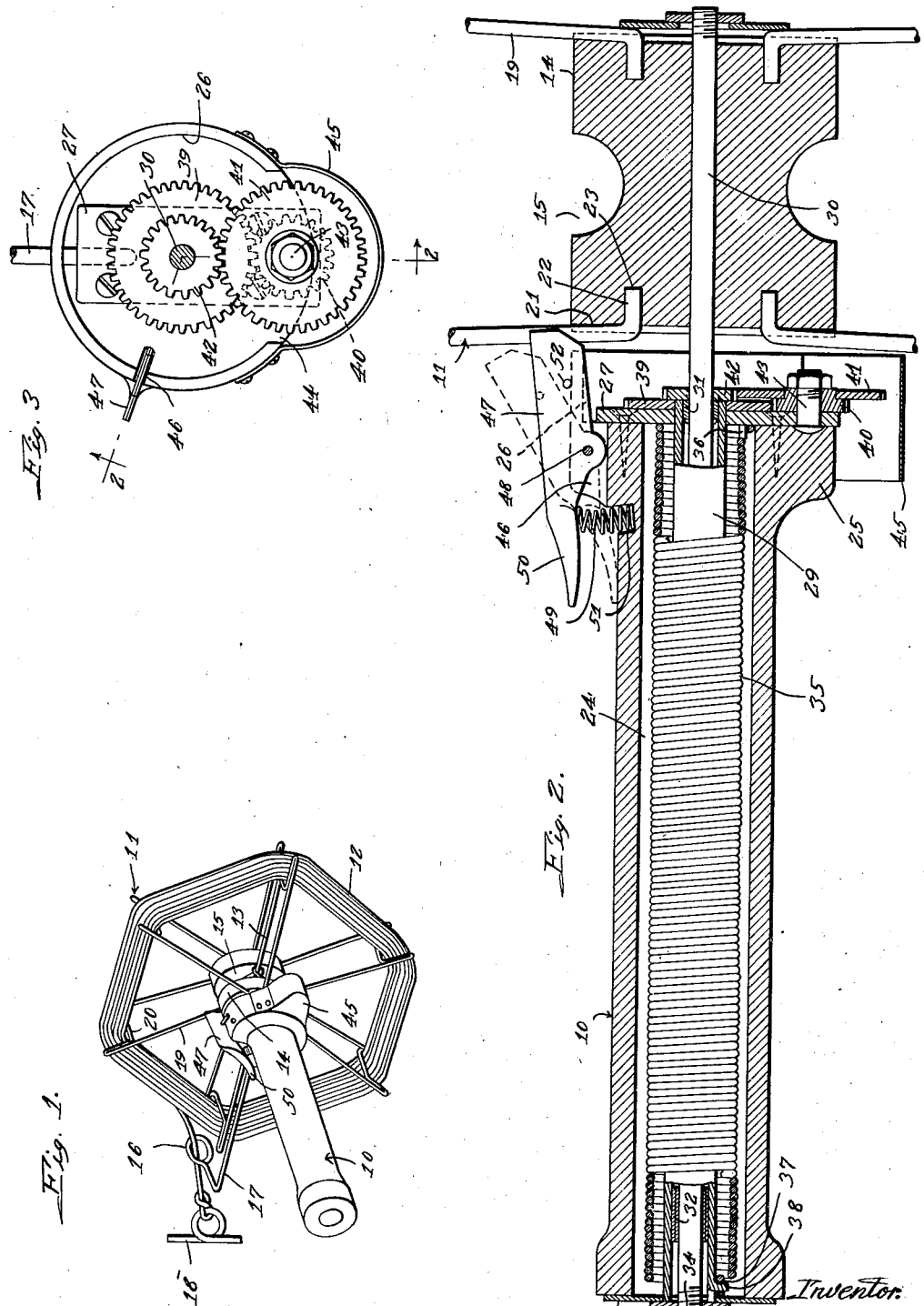

Patented Nov. 28, 1939

2,181,141

UNITED STATES PATENT OFFICE 2,181,141

CLOTHESLINE REEL

Hokan A. Lovegran, Rockford, Ill.

Refiled for abandoned application Serial No. 527,906, April 6, 1931. This application March 15, 1935, Serial No. 11,306

6 Claims. (Cl. 242—102)

This invention relates to a new and improved form of clothesline reel.

This application is a refile for abandoned application Serial No. 527,906, filed April 6, 1931, and allowed April 20, 1932.

The principal object of my invention is to provide a clothesline reel of a handier form than has been available in the past and one which by reason of its special construction will accommodate as long a line as one would ordinarily be apt to use, and permit the winding and unwinding of the line with greater ease and facility than can be said of most other reels with which I am familiar.

A salient feature of my improved reel consists in the elongated handle by means of which the reel can be held with both hands, if so desired, when winding or unwinding the line, the said handle being made hollow to provide longitudinally spaced bearings therein for the reel shaft, as well as a place to house the long coiled torsion spring used in connection with the reel for turning the same. Another feature is the provision of a latch on the handle adjacent the reel for quickly detachably locking the reel against turning, the said latch being arranged for convenient manipulation by thumb pressure while holding the handle, so that the latch is out of the way and permits the reel to turn freely in winding or unwinding the line.

The invention is illustrated in the accompanying drawing, in which—

Figure 1 is a perspective view of my improved clothesline reel;

Fig. 2 is a longitudinal section taken on the broken line 2—2 of Fig. 3, and

Fig. 3 is a cross-section taken adjacent the reel looking toward the handle.

The reel of my invention, as should be evident from Figure 1, comprises an elongated handle 10 carrying a reel 11 on one end thereof to turn on the longitudinal axis of the handle to wind or unwind the clothesline 12, the inner end of which, as shown at 13, is fastened to the hub 14 of the reel in the annular groove 15. The other end of the line extends through a guide 16 provided on the bent, outer end of a wire arm 17 reaching out from the handle 10 to the rim of the reel, and a cross piece 18 of bent wire or the like is suitably fastened on the end of the line to keep it from coming out of the guide when the line is wound up on the reel. It is manifest from the description thus far that I have provided a clothesline reel of a handy form, one which permits a good hold to be taken on the handle as the line is being unwound or rewound. The handle is sufficiently elongated so that one can hold the same with both hands, if so desired.

The reel 11, for the sake of economy, as well as lightness, is made up of a plurality of one-piece wire spokes 19 bent to approximately U-form with the bight portions bent inwardly, as at 20, to provide recesses for the reception of the line 12 in the rim portion of the reel. The inner ends of the spokes fit in radial grooves 21 formed in the sides of the hub 14 which is preferably made of wood, and the extremities are bent toward each other, as appears at 22, for a press fit in holes 23 provided therefor in the hub in register with the grooves 21. This gives a reel of economical form and one which, although very light, is, nevertheless, quite strong and rigid. The handle 10, which is preferably also of wood for cheapness and lightness, is bored out the full length thereof, as appears at 24, and has the inner enlarged end 25 counterbored, as at 26, to serve as a housing for the reduction gearing presently to be described. A plate 27 is fastened to the inner end of the handle in the counterbore 26, and another plate 28 is fastened to the other end of the handle. These plates have center holes in which the opposite ends of a tube 29 are rotatably received. A shaft 30, on which the reel 11 is mounted, extends through the tube 29, being received in bearings 31 and 32 therein at opposite ends thereof. A nut 33 threads on the outer end of the reel shaft, whereupon the projecting end of the shaft is upset, as at 34, to keep the parts permanently assembled together. Now, a long coiled torsion spring 35 is housed in the bore 24 in the handle 10 about the tube 29, and has its inner end fixed to the handle on a pin 36 projecting from the inside of the plate 29, whereas the outer end of the spring is looped, as appears at 37, over a lug 38 projecting radially outwardly from the outer end of the tube 29. A gear 39, fixed on the inner end of the tube 29, is arranged to turn the tube so as to wind up the spring 35 as the reel 11 is turned in the unwinding of the line 12. There is approximately a 4:1 reduction gearing driving connection between the shaft 30 and tube 29 provided by the gears 39—42. Of these, the gears 40 and 41 are in a cluster on a stud 43 carried on the plate 27, and the gear 42 is mounted on the shaft 30, the gear 39 meshing with gear 40, and gear 41 meshing with gear 42, so that for every four turns of the gear 42, there will be approximately one turn of the gear 39. The end 25 of the handle could be enlarged sufficiently to accommodate the reduction gearing in the counterbore 26, but I prefer to have it of the size shown, such that the gears 40 and 41 project slightly from one side of the handle through an opening 44. A small sheet metal guard 45 serves to enclose the projecting gears. The enlarged end 25 of the handle is provided with a longitudinal slot 46 for reception of a flat elongated latch or keeper 47 which is pivotally mounted in the slot on a pin 48 intermediate the ends thereof. A coiled compression spring 49 cooperates with the thumb portion 50 provided on the outer end of the latch to urge the latch normally toward the full line position shown in Fig. 2 in which the inner end of the latch is disposed in the path of the spokes 19 of the reel to prevent turning thereof. The spring 49 is conveniently located in a hole 51 provided therefor in the handle under the thumb portion 50 of the latch. A cross pin 52 on the latch 47 near the inner end thereof limits the movement of the latch to hold it in the full line position, and the latch is arranged when operated by thumb pressure to be moved to the dotted line position to unlock the reel so that it can turn freely.

In operation, the clothesline reel will be held in approximately the position shown in Figure 1 in winding or unwinding the line. The latch or keeper 47 is held in the unlocked position by thumb pressure on the outer end portion 50 thereof, while holding the handle 10. The device may be held in both hands, if desired, so that it takes very little effort in the handling thereof. As soon as the desired length of line has been unwound from the reel, thumb pressure on the latch is released and that locks the reel against turning. Subsequently, when the line is to be rewound, the latch is unlocked by thumb pressure again to allow the reel to turn under action of the spring 35 to rewind the line thereon. The present construction with its elongated handle serving as a spring housing permits the use of such a long spring that there is no difficulty in handling as long a line as one would be apt to use.

I claim:

1. A reel of the class described comprising a handle, a reel shaft extending from the end of the handle, spring means tending normally to turn the shaft in one direction, a reel carried on the projecting end of the shaft, the same comprising a plurality of radially projecting spokes, a latch pivotally mounted intermediate its ends on the end of the handle adjacent the reel for oscillatory movement to and from locking position, the one end of said latch being movable into and out of the path of movement of the spokes of the reel in the oscillatory movement of the latch, and the other end of said latch constituting a thumb portion for depression of the latch to unlocked position, and spring means normally urging the latch toward locked position, the said latch being operable by hand in the holding of the handle.

2. A reel of the class described comprising a handle, a reel shaft extending from the end of the handle, spring means tending normally to turn the shaft in one direction, a reel carried on the projecting end of the shaft, the same comprising a plurality of radially projecting spokes, a latch mounted on the end of the handle adjacent the reel for movement to and from locking position, the one end of the latch being movable into and out of the path of movement of the spokes of the reel, and the other end of said latch being adapted for manual operation to move the latch to unlocked position, and spring means normally urging the latch toward locked position, the said latch being operable by hand in the holding of the handle.

3. A clothesline reel comprising a single elongated handle, a reel support extending coaxially from the handle, a reel thereon alongside the handle and of large diameter in relation thereto, spring means tending normally to turn the reel in one direction, the reel having a plurality of circumferentially spaced laterally projecting stop projections on the side thereof toward the handle, a latch and actuating spring carried on said handle on the end next to the reel, the latch extending lengthwise of the handle but being short in relation to the length of the handle so as to leave the major portion of the handle free to be grasped in the hand of the operator, the latch tending normally to move into the path of movement of the stop projections, and manually operable means on the outer end of the latch for releasing the same.

4. A clothesline reel comprising a single elongated handle, a reel support extending from one end of the handle, a reel thereon alongside the handle and of large diameter in relation thereto, the reel having a plurality of circumferentially spaced projections on the side thereof toward the handle, a latch and actuating spring carried on said handle on the end next to the reel, the latch extending lengthwise of the handle but being short in relation to the length of the handle so as to leave the major portion of the handle free to be grasped in the hand of the operator, the latch tending normally to move into the path of movement of the projections, and manually operable means on the outer end of the latch for releasing the same.

5. A reel of the class described comprising a handle, a reel shaft extending from the end of the handle, a reel carried on the projecting end of the shaft, the same comprising a plurality of radially projecting spokes, a latch pivotally mounted intermediate its ends on the end of the handle adjacent the reel for oscillatory movement to and from locking position, the one end of said latch being movable into and out of the path of movement of the spokes of the reel in the oscillatory movement of the latch, and the other end of said latch constituting a thumb portion for depression of the latch to unlocked position, and spring means normally urging the latch toward locked position, the said latch being operable by hand in the holding of the handle.

6. A reel of the class described comprising a handle, a reel shaft extending from the end of the handle, a reel carried on the projecting end of the shaft, the same comprising a plurality of radially projecting spokes, a latch mounted on the end of the handle adjacent the reel for movement to and from locking position, the one end of the latch being movable into and out of the path of movement of the spokes of the reel, and the other end of said latch being adapted for manual operation to move the latch to unlocked position, and spring means normally urging the latch toward locked position, the said latch being operable by hand in the holding of the handle.

HOKAN A. LOVEGRAN.